Figure 1:
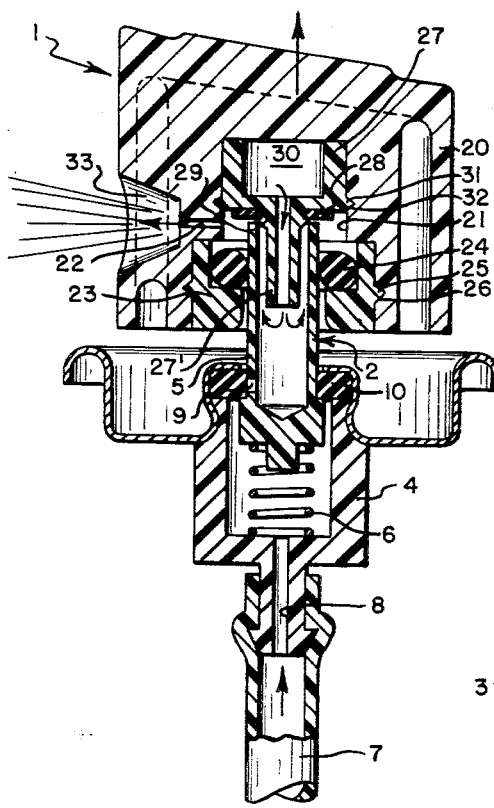

May 10, 1966  L. T. WARD  3,250,444

METERING BUTTON VALVE CONSTRUCTION

Filed Sept. 10, 1964

INVENTOR
Lawrence T. Ward
BY
ATTORNEYS

United States Patent Office 3,250,444
Patented May 10, 1966

3,250,444
METERING BUTTON VALVE CONSTRUCTION
Lawrence T. Ward, Portland, Pa., assignor to Seary Limited, Zug, Switzerland
Filed Sept. 10, 1964, Ser. No. 395,542
8 Claims. (Cl. 222—394)

This invention relates to a metering button valve construction, and more particularly to a metering button cap which may be attached to conventional continuous flow valves having hollow depressible valve stems used with aerosol type pressurized containers in order to convert the continuous flow valves to metering valves.

Metering button caps by which continuous flow valves may be converted to metering valves for use with aerosol type pressurized containers have been proposed in the past, as for example, the button caps disclosed in my U.S. Patent No. 2,892,576. It is desirable that such button caps be constructed so that they may be applied to a variety of continuous flow valves having different operating stem sizes and so that the amount of fluid to be metered from the dispenser may be readily varied. It is also desirable that a cap be attached to the continuous flow valve with a minimum of effort so that if desired, the cap may be easily changed or attached to a separate continuous flow valve when the contents of a container becomes exhausted.

It is therefore an object of my invention to provide for a button cap structure which may be attached to a continuous flow valve easily and economically and which may easily have the size of a metering chamber contained partially within the button cap varied. It is a further desirable characteristic to have the button cap so constructed to accommodate any off-center application of actuating force caused by finger pressure being applied to an edge of the button cap rather than at the center.

Briefly, a button cap constructed according to my invention which will have these desirable characteristics comprises a cap body portion having a main chamber therein open at one end with an outlet passage passing through the side wall of the body and connecting the exterior of the body portion with the main chamber. A cage is inserted in the open end of the chamber and carries therein a sealing gasket which in turn is adapted to sealingly engage with the outer periphery of a hollow depressible valve stem of a conventional continuous flow valve. A stem body is also located within the chamber in the cap body which is adapted to extend into the hollow operating stem of the continuous flow valve to which the button cap is attached and which carries an annular sealing gasket adapted to engage with the annular end of the hollow depressible valve stem. The stem body in addition defines a subchamber within the cap body which subchamber along with the interior of the operating stem forms a metering chamber of the metering valve.

The cap body portion, cage and stem body are adapted to be movable with respect to the hollow depressible stem when an actuating force in the form of finger pressure is applied to the cap body so that the gasket or seal carried by the stem body may close off the end of the hollow depressible stem in order to seal the metering chamber contained within the depressible stem and stem body from the outlet passage leading to the exterior of the cap body. Continuous flow valve stems of different sizes may be accommodated by varying the size of the cage and the gasket carried in the cage. Similarly, the size of the metering chamber may be varied by varying the construction of the stem body carried within the cap body.

Figure 2:
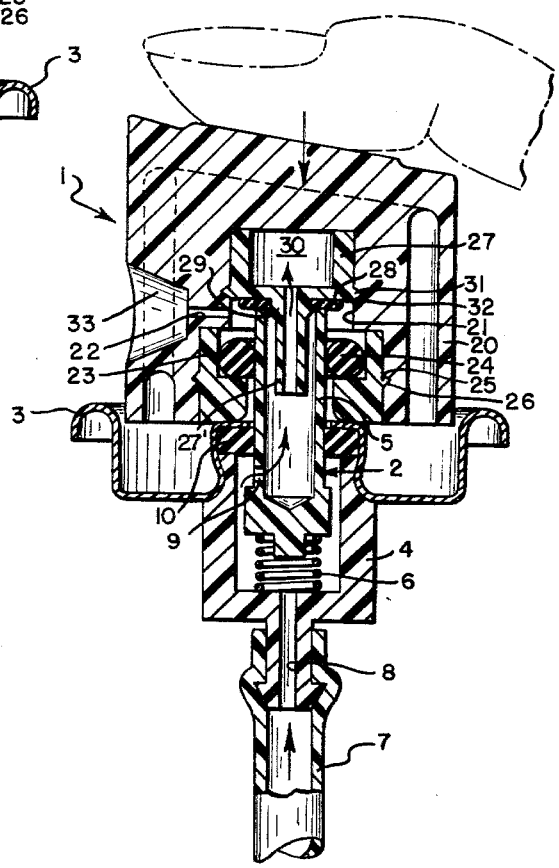

Referring to the drawings in which a preferred embodiment of my invention is shown, FIG. 1 is a cross-sectional view of a metering button cap applied to a conventional continuous flow valve illustrating flow from the metering chamber to the exterior of the button cap, and FIG. 2 is a view similar to FIG. 1 illustrating an actuating force applied to the button cap wherein there is a flow into the interior of the metering chamber from a pressurized container to which the valve assembly is attached.

Referring to the drawings in greater detail, and in particular to FIG. 1, there is illustrated a metering button cap 1 mounted on a conventional continuous flow valve 2, in turn carried by the collar 3 of a pressurized container not shown. The conventional continuous flow valve 2 comprises a valve housing 4 having a hollow depressible valve stem 5 which is biased outwardly of the housing by means of spring 6 positioned between the bottom of the stem and the housing. A dip tube 7 extends to the bottom of the container to provide a passage for fluid entering the housing through the inlet passage 8. The stem 5 has an inlet port 9 which is normally sealed off by the gasket 10, positioned between the housing 4 and the collar 3, when the stem is moved outwardly of the housing by the spring 6.

The cap 1 comprises a body portion 20 having a chamber 21 therein open at its bottom end which is connected to the exterior of the cap by a discharge passage 22. A cage 23 is positioned at the open end of chamber 21 and carries a gasket 24 which sealingly engages with the outer periphery of the stem 5. The gasket shown in FIG. 5 is an O-type seal but it is to be understood that a flat washer type seal or other type seal could be used instead of the O-ring seal shown. The cage 23 is push fitted into the body 20 so that the bead 25 on the cage locks into the groove 26 carried in the body.

A stem body 27 is also positioned within the chamber 21 and has a tubular stem portion 27' extending down into the open end of the hollow valve stem 5. The stem body also carries an annular seal 28 which is held onto the stem body by an annular shoulder 29 which seal is adapted to engage and seal the annular end of the hollow stem 5 when a force is applied to the cap 20 to move it downwards. The stem body 27 defines with the body 20 a subchamber 30 which is in communication with the interior of the hollow valve stem 5 so that the subchamber 30 and the interior of the hollow valve stem together form a metering chamber. The stem body 27 is push fitted into the cap body 20 so that bead 31 on the stem body locks into groove 32 carried in the cap body.

The operation of the metering valve can best be seen by reference to FIG. 2 where finger pressure is used to depress the hollow valve stem 5 unmasking the port 9 so that the pressurized contents of the container may flow up through the dip tube 7 into the interior of the hollow valve stem and on into the chamber 30. The initial force exerted by the finger will first cause the body 20 to move downwardly on the hollow valve stem such that the annular seal 28 will engage the annular end of the hollow valve stem to seal it off before port 9 is unmasked.

Release of finger pressure will allow the spring 6 to move the stem 5 outwardly of the valve housing to again mask the port 9 and pressure within the subchamber 30 and the interior of the hollow stem, both of which comprise a metering chamber, will move the cap 20 upwardly with respect to the stem 5 so that seal 28 is moved off of the annular end of the hollow valve stem as shown in FIG. 1. The pressurized contents within the metering chamber will then flow from the metering chamber out through passage 22 and through a spray nozzle opening 33 to the exterior of the button cap 1.

The button cap 1 may be easily adapted to valve stems of different sizes merely by changing the size of the cage 23, gasket 24 and seal 28. In addition, the metering capacity of the button cap may be readily changed by varying the size of the chamber 30 by inserting stem bodies 27 of different size into the cap body.

The construction shown also provides a valve assembly which allows ready filling of the pressurized container. This is accomplished by attaching a filling unit to the end of the hollow valve stem 5 before the button cap is applied and filling the pressurized container. After the container is removed from the filling unit, the button cap may then be applied to the hollow valve stem so as to convert the conventional continuous flow valve shown to a metering valve.

The construction illustrated is rugged and will accommodate an off-center application of an actuating force because the stem portion 27' will tend to insure that the button cap is always centered with respect to the hollow valve stem 5.

In addition, the button cap shown may be readily constructed of molded plastic parts such that a minimum or no machining of the separate parts is required as there is no requirement that minute working tolerances as to the dimensions of the parts be maintained for the valve to operate efficiently.

While I have illustrated a preferred embodiment of my invention, it is apparent that slight structural changes could be made which would still come within the scope of the invention which is defined in the appended claims.

I claim:
1. A metering button cap for use with a continuous flow valve having a hollow depressible valve stem, said button cap comprising a cap body having an open ended main chamber therein, a discharge passage extending from the outside of said cap body into said main chamber, a cage in the open end of said chamber, an annular seal carried by said cage adapted to sealingly and slidably engage the outer periphery of said hollow depressible valve stem of said continuous flow valve, a stem body in said main chamber defining with said cap body a subchamber and having a tubular stem portion adapted to extend into the hollow valve stem to be engaged by the annular seal, and an annular sealing gasket carried by said stem body adapted to sealingly engage with the annular end of the hollow valve stem wherein said subchamber together with the interior of the hollow valve stem operate as a metering chamber and wherein said annular sealing gasket and the annular end of the valve stem operate as an outlet valve for closing off the metering chamber from the discharge passage.

2. A metering button cap according to claim 1 wherein said stem body is joined to said cap body by a push fit.

3. A metering button cap according to claim 1 wherein said cage is joined to said cap body by a push fit.

4. A metering button cap according to claim 1 wherein said annular seal is an O-ring type seal.

5. A metering valve assembly for a pressurized container comprising a valve housing adapted to be mounted in the end of a pressurized container, a hollow depressible valve stem, a spring positioned between said housing and said valve stem for urging said stem outwardly of said housing, an inlet port extending through the side wall of said stem, annular seal means on an end of the housing for sealing off said port when said stem is moved outwardly of said housing, a cap body having a main open ended chamber therein slidably mounted on the outer end of said hollow stem, annular gasket means on the open end of the cap body for sealing the outer periphery of said depressible valve stem, a hollow stem body mounted in said open ended chamber and extending into said hollow depressible valve stem and defining with said cap body a subchamber, an annular sealing gasket carried by said stem body adapted to sealingly engage the annular end of said hollow depressible valve stem, and a discharge passage extending through the cap body from the outside into the main chamber; said subchamber and the interior of said hollow depressible valve stem forming together a metering chamber wherein when said hollow depressible valve stem is depressed, pressurized fluid may flow into said hollow valve stem and subchamber through said port, and when said hollow stem is moved outwardly of said housing to close said port, fluid will flow from within said hollow stem and subchamber between said outlet seal and the end of said hollow valve stem and out through said discharge passage.

6. A metering valve assembly according to claim 5 wherein said stem body is push fitted into said cap body.

7. A metering valve assembly according to claim 5 wherein said annular gasket means is positioned on the cap body by a cage push fitted into said cap body.

8. A metering valve assembly according to claim 7 wherein said annular gasket means is an O-ring type gasket.

References Cited by the Examiner
UNITED STATES PATENTS

| | | | |
|---|---|---|---|
| 2,892,576 | 6/1959 | Ward | 239—350 X |
| 2,989,217 | 6/1961 | Focht. | |
| 3,052,382 | 9/1962 | Gawthrop. | |
| 3,138,301 | 6/1964 | Ward. | |

RAPHAEL M. LUPO, *Primary Examiner.*